United States Patent
Brown

(10) Patent No.: US 9,208,520 B2
(45) Date of Patent: Dec. 8, 2015

(54) SHELF LIFE EXPIRATION DATE MANAGEMENT

(75) Inventor: Peter Brown, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 13/096,793

(22) Filed: Apr. 28, 2011

(65) Prior Publication Data

US 2012/0278190 A1    Nov. 1, 2012

(51) Int. Cl.
 *G06Q 10/00* (2012.01)
 *G06Q 30/06* (2012.01)
 *G06Q 10/08* (2012.01)

(52) U.S. Cl.
 CPC ............. *G06Q 30/06* (2013.01); *G06Q 10/087* (2013.01)

(58) Field of Classification Search
 None
 See application file for complete search history.

(56) References Cited

U.S. PATENT DOCUMENTS

| | | | |
|---|---|---|---|
| 6,327,576 B1 * | 12/2001 | Ogasawara | 705/22 |
| 7,050,991 B2 | 5/2006 | Ogasawara | |
| 2003/0023493 A1 | 1/2003 | Ohashi et al. | |
| 2006/0178947 A1 | 8/2006 | Zsigmond et al. | |
| 2007/0069013 A1 * | 3/2007 | Seifert et al. | 235/383 |
| 2007/0089433 A1 | 4/2007 | McDonnell et al. | |
| 2008/0052200 A1 * | 2/2008 | Bodin et al. | 705/28 |
| 2010/0187306 A1 | 7/2010 | Solomon | |

FOREIGN PATENT DOCUMENTS

| | | |
|---|---|---|
| GB | 2439623 | 1/2008 |
| JP | 11316076 | 11/1999 |
| JP | 2003122914 | 4/2003 |
| JP | 2005037086 | 2/2005 |

\* cited by examiner

*Primary Examiner* — Matthew Gart
*Assistant Examiner* — Michael Maicher
(74) *Attorney, Agent, or Firm* — Steven M. Greenberg, Esq.; CRGO Law

(57) ABSTRACT

Embodiments of the present invention provide a method, system and computer program product for shelf life expiration date management for smart refrigerators. In an embodiment of the invention, a method for shelf life expiration date management for smart refrigerators is provided. The method includes identifying a consumer during a point of sale transaction for purchasing different food items by a point of sale computer system, for example by scanning a bar code or reading a magnetic strip of a loyalty program card or reading a radio frequency identification (RFID) dongle. A list of the different food items can be provided to the smart refrigerator, for example from storage in the loyalty program card or RFID dongle, or as transmitted from the point of sale computer system to the smart refrigerator over a computer communications network. Finally, expiration dates can be determined for the food items in the list and stored in the smart refrigerator.

13 Claims, 1 Drawing Sheet

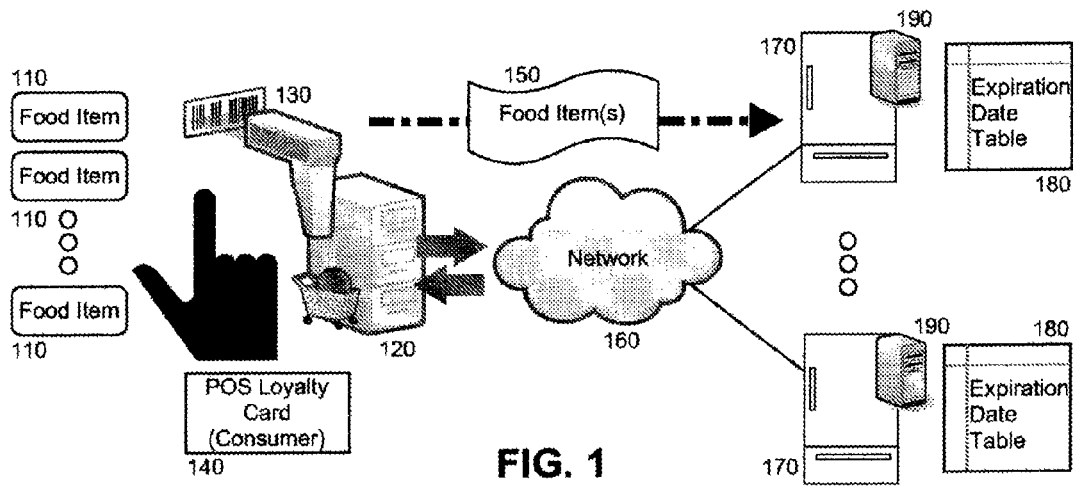
FIG. 1
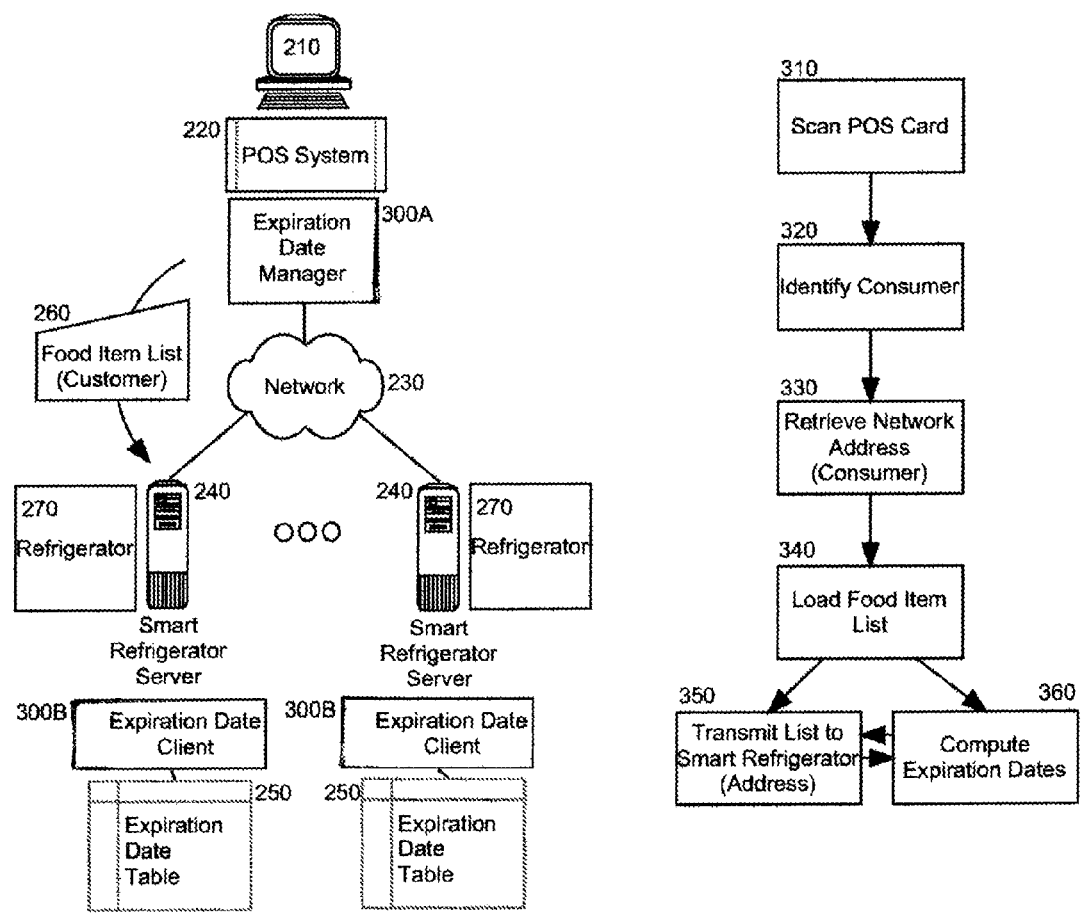
FIG. 2          FIG. 3

SHELF LIFE EXPIRATION DATE MANAGEMENT

BACKGROUND OF THE INVENTION

1. Field of the Invention

The present invention relates to managing expiration dated products and more particularly to refrigerator contents management.

2. Description of the Related Art

A refrigerator, commonly referred to as a "fridge" is a kitchen appliance tasked with cooling its contents. Generally, a refrigerator includes a thermally insulated compartment and a heat pump designed to transfer heat from the thermally insulated compartment to the external environment thereby cooling the contents of the compartment to a temperature below ambient. As it is well known, cooling is a popular food storage technique in developed countries and operates to extend the shelf-life of food by decreasing the reproduction rate of bacteria in the food. The refrigerator thus is used to reduce the rate of spoilage of foodstuffs.

The shelf-life of foodstuffs pertains to the date at which it is expected the foodstuffs to become spoiled despite the operation of the refrigerator. To alert the consumer of the expiration date of a particular product, often the packaging or labeling of the product includes a printed indication of the expiration date of the product. However, as the capacity of a refrigerator can be substantial, in many cases the consumer simply forgets to check the expiration dates of different stored foodstuffs in the refrigerator and frequently can be placed in the position of having to discard unconsumed foodstuffs that have exceeded their respective shelf-lives.

Smart home technologies act to avoid the unnecessary waste of foodstuffs. In this regard, basic smart refrigerators can be programmed by the consumer to alert the consumer when a particular product has exceeded its shelf-life. More advanced smart refrigerators can provide for the optical scanning or wireless sensing of the product expiration date directly from information included with the product packaging. Even more advanced smart refrigerators cooperate with smart containers to achieve the automated tracking of food product expiration dates. Of note, smart refrigerators can include embedded computing systems, or smart refrigerators can be conventional refrigerators with coupled computing systems. In the latter instance, a conventional refrigerator can be retrofitted with a computing system to render the conventional refrigerator a smart refrigerator.

Smart food containers are equipped with communicative sensors that can interact with a reader attached to the refrigerator, and connected to a touchscreen. Whenever a container is used and stored in the fridge, the container can be scanned, recognized, and the user can be prompted to enter food information the contents of the container into an associated computer system. Based on food information and refrigerator settings, the software can calculate how long the food will remain edible and keep stock. Of note, smart refrigerators further can be permit remote access to internal data, for example from a mobile device so that when a consumer shops at the grocery store, the consumer can determine in real time food items to purchase based on low stock reports from the smart refrigerator.

BRIEF SUMMARY OF THE INVENTION

Embodiments of the present invention address deficiencies of the art in respect to smart refrigerators and provide a novel and non-obvious method, system and computer program product for shelf life expiration date management for smart refrigerators. In an embodiment of the invention, a method for shelf life expiration date management for smart refrigerators is provided. The method includes identifying a consumer during a point of sale transaction for purchasing different food items by a point of sale computer system, for example by scanning a bar code or reading a magnetic strip of a loyalty program card or reading a radio frequency identification (RFID) dongle. A list of the different food items can be provided to the smart refrigerator from example from storage in the loyalty program card or the RFID dongle, or as transmitted by the point of sale computer system to the smart refrigerator over a computer communications network. Finally, expiration dates can be determined for the food items in the list and stored in the smart refrigerator.

In one aspect of the embodiment, the expiration dates for the food items in the list can be transmitted from the point of sale system to the smart refrigerator. In another aspect of the embodiment, the expiration dates for the food items in the list can be retrieved from a source in the computer communications network from the smart refrigerator. In yet another aspect of the embodiment, the expiration dates can be retrieved from a data store in the smart refrigerator. In any event, once the expiration dates have been stored in the smart refrigerator, the consumer can be alerted when a food item in the smart refrigerator has an expiration date that has lapsed.

In another embodiment of the invention, a smart refrigerator data processing system is provided. The system includes a smart refrigerator. The smart refrigerator includes both a refrigerator and also a host computer with memory and at least one processor. The smart refrigerator is configured for communicative coupling to a point of sale system over a computer communications network and also includes an expiration date client executing in the memory of the host computer. The client includes program code enabled to receive from storage in an identification device such as a loyalty program card or RFID dongle, or from the point of sale system over the computer communications network a list of food items purchased by a consumer at the point of sale system, to determine expiration dates for the food items, and to generate an alert when a food item in the refrigerator has an expiration date that has lapsed. Optionally, the loyalty program card can identify the consumer and specify an address of the host computer of the smart refrigerator.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for shelf life expiration date management for smart refrigerators;

FIG. 2 is a schematic illustration of a smart refrigerator data processing system configured for shelf life expiration date management; and, FIG. 3 is a flow chart illustrating a process for shelf life expiration date management for smart refrigerators.

DETAILED DESCRIPTION OF THE INVENTION

Embodiments of the invention provide for shelf life expiration date management for smart refrigerators. In accordance with an embodiment of the invention, a smart refrigerator can be provided for a consumer. At checkout in a grocery store, an identification for the consumer can be provided to a point of sale system. For example, the identification can be provided by way of a consumer loyalty magnetic strip card or consumer loyalty RFID dongle. Thereafter, one or more purchased food items by the consumer recorded in the point of sale system can be associated with the consumer in a list and provided to the smart refrigerator either directly through a storage medium into which a list can be stored such as a consumer loyalty magnetic strip card or consumer loyalty RFID dongle, or communicatively over a computer network at an address associated with the consumer and mapped to the identification. Optionally, expiration date information for individual ones of the purchased food items in the list can be provided to the particular one of the smart refrigerators, or the particular one of the smart refrigerators can retrieve the expiration date information for the individual ones of the purchased food items from a network source. Finally, the expiration date information can be used in the particular one of the smart refrigerators to trigger a notification when a food item is about to expire or has expired.

In further illustration, FIG. 1 is a pictorial illustration of a process for shelf life expiration date management for smart refrigerators. As shown in FIG. 1, a consumer can select for purchase multiple different food items 110. A point of sale system 120 can process the purchase of the food items 110. Additionally, an identification device 140 identifying the consumer, for example a loyalty program card or loyalty program RFID dongle, can be scanned by a scanner 130 at the point of sale system 120. Thereafter, a list 150 of the purchased food items 110 can be stored in the identification device 140. Alternatively, the identification of the consumer by the identification device 140 can be used to select a particular smart refrigerator 170 communicatively coupled to the point of sale system 120 over a computer communications network such as the global Internet.

In the former instance, the list 150 of the food items 110 can be provided to the smart refrigerator 170 directly by scanning the identification device 140 in the smart refrigerator 170. In the latter instance, the list 150 of the food items 110 can be provided electronically over the network to the selected smart refrigerator 170. In either circumstance, an expiration date table 180 can be maintained in the selected smart refrigerator 170 for the food items 110 in the list 150 based upon expiration date information for the food items 110 provided by the point of sale system 120, or retrieved by the selected smart refrigerator 170. In this way, the expiration date information for all of the food items 110 purchased can be tracked in a single transaction at the time of purchase of the food items 110.

The process described in connection with FIG. 1 can be implemented in a smart refrigerator data processing system. In yet further illustration, FIG. 2 is a schematic illustration of a smart refrigerator data processing system configured for shelf life expiration date management. The system can include a host computer 210 with memory and at least one processor supporting the execution of a point of sale system 220. The host computer 210 can be configured for communicative coupling to different smart refrigerator computing systems 240 coupled respective refrigerators 270 over a computer communications network 230 such as the global Internet. An expiration date manager 300A can execute in conjunction with the point of sale system 220 and in concert with different expiration data clients 300B disposed in respectively different ones of the smart refrigerator computing systems 240.

In this regard, the expiration data manager 300A can include program code to identify a consumer purchasing food items, and to store a list 260 of the purchased food items by the consumer in an identification device such as a consumer loyalty magnetic strip card or consumer loyalty RFID dongle. Alternatively, the expiration data manager 300A can include program code to select a particular one of the smart refrigerator computing systems 240 corresponding to the identified consumer, and to forward to the particular one of the smart refrigerator computing systems 240 over the network 230 the list 260 of the purchased food items by the consumer. In either circumstance, the expiration date client 300B executing in the memory of the particular one of the smart refrigerator computing systems 240 can receive the list 260 either directly by scanning the identification device, or from over the network 230, and store in an expiration date table 250 the food items in the list and associated expiration dates.

In particular, the associated expiration dates can be provided by the expiration date manager 300A, retrieved from information sources of the network 230, or retrieved locally from a data store of expiration dates mapped to different food items. In any event, thereafter, the particular one of the smart refrigerator computing systems 240 can alert a consumer to an expired product in comparing the records of the expiration date table 250 to a current date. Optionally, when a food item in the list already appears in the expiration date table 250, the expiration date client can prompt the consumer to update whether or not the food item replaces a prior food item thereby requiring only an update of the expiration date.

In even yet further illustration of the operation of the expiration date manager 300A, FIG. 3 is a flow chart illustrating a process for shelf life expiration date management for smart refrigerators. Beginning in block 310, a personal identification card for a consumer can be scanned, for example a bar code in a loyalty card, a magnetic stripe of a loyalty card, or an RFID dongle of the consumer. In block 320, the consumer can be determined from the scanning and, optionally, in block 330 a network address for a corresponding smart refrigerator can be determined based upon the determined consumer. In block 340, a list of food items purchased by the consumer can be loaded and either stored onto the personal identification card for subsequent scanning in the corresponding smart refrigerator, or in the optional circumstance, transmitted to the network address of the smart refrigerator in block 350. In block 360, expiration dates for the different food items can be determined, either before or after providing the list to the smart refrigerator. In this way, with a single transaction at the point of sale, all expiration data for purchased food items can be provided to a smart refrigerator for an identified consumer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for shelf life expiration date management for smart refrigerators, the method comprising:
   identifying a consumer during a point of sale transaction for purchasing different food items by a point of sale computer system;
   selecting, by the point of sale computer system, an address of a smart refrigerator corresponding to the identified consumer, the smart refrigerator comprising a refrigerator and a computer with a memory and at least one processor;
   transmitting a list of different food items and expiration dates for different food items in the list of different food items directly from the point of sale computer system to the smart refrigerator over a computer communications network;
   prompting, by the smart refrigerator, the consumer to indicate whether a food item on the list of different food items replaces the food item on a second list of different food items already stored in an expiration date table on the smart refrigerator upon determining that the food item on the list of different food items already appears on the second list of different food items;
   updating, by the smart refrigerator, only an expiration date of the food item on the second list of different food items in response to receiving a response from the consumer indicating the food item replaces the food item on the second list of different food items; and,
   storing, by the smart refrigerator, the expiration dates and the list of different food items in the expiration date table on the smart refrigerator.

2. The method of claim 1, wherein identifying the consumer during point of sale transaction for purchasing different food items by the point of sale computer system, comprises scanning a point of sale loyalty program card of the consumer.

3. The method of claim 1, wherein identifying the consumer during the point of sale transaction for purchasing different food items by the point of sale computer system, comprises reading a radio frequency identification (RFID) dongle for a point of sale loyalty program card of the consumer.

4. The method of claim 1, further comprising alerting, by the smart refrigerator, the consumer when a food item in the smart refrigerator has an expiration date that has lapsed.

5. A smart refrigerator data processing system comprising:
   a smart refrigerator comprising a refrigerator and a host computer with memory and at least one processor, and configured for communicative coupling to a point of sale system over a computer communications network;
   an expiration date client executing in the memory of the host computer, the expiration date client comprising program code enabled to receive a list of different food items purchased by a consumer at the point of sale system, to prompt the consumer to indicate whether a food item on the list of different food items replaces the food item on a second list of different food items already stored in a expiration table on the smart refrigerator upon determining that the food item on the list of different food items already appears on the second list of different food items, to update only the expiration date of the food item on the second list of different food items in response to receiving a response from the consumer indicating the food item replaces the food item on the second list of different food items, to store the expiration dates and the list of different food items in the expiration data table on the smart refrigerator, and to generate an alert when a food item in the refrigerator has an expiration date that has lapsed;
   a second host computer with memory and at least one processor, the second host computer coupled to the point of sale system and the expiration date client; and,
   an expiration data manager executing in the memory of the second host computer, the expiration data manager comprising program code enabled to identify the consumer during a point of sale transaction for purchasing different food items by the point of sale system, to select an address of the smart refrigerator corresponding to the identified consumer, and to transmit the list of different food items and expiration dates for different food items in the list of different food items directly from the point of sale computer system to the smart refrigerator.

6. The system of claim 5, further comprising a loyalty program card identifying the consumer and storing the list of different food items purchased by the consumer at the point of sale system.

7. A computer program product for shelf life expiration date management for smart refrigerators, the computer program product comprising:
   a computer readable storage medium having computer readable program code embodied therewith that executes in conjunction with a point of sale computer system and also in concert with a smart refrigerator, the computer readable program code comprising:
   computer readable program code for identifying a consumer during a point of sale transaction for purchasing different food items by the point of sale computer system;
   computer readable program code for selecting, by the point of sale computer system, an address of the smart refrigerator corresponding to the identified consumer, the smart refrigerator comprising a refrigerator and a computer with a memory and at least one processor;
   computer readable program code for transmitting a list of different food items and expiration dates for different food items in the list of different food items directly from the point of sale computer system to the smart refrigerator over a computer communications network;
   computer readable program code for prompting, by the smart refrigerator, the consumer to indicate whether a food item on the list of different food items replaces the food item on a second list of different food items already stored in a expiration date table on the smart refrigerator upon determining that the food item on the list of different food items already appears on the second list of different food items;
   computer readable program code for updating, by the smart refrigerator, only an expiration date of the food item on the second list of different food items in response to receiving a response from the consumer indicating the food item replaces the food item on the second list of different food items; and,
   computer readable program code for storing, by the smart refrigerator, the expiration dates and the list of different food items in the expiration date table on the smart refrigerator.

8. The computer program product of claim 7, wherein the computer readable program code for identifying the consumer during the point of sale transaction for purchasing different food items by the point of sale computer system, comprises computer readable program code for scanning a point of sale loyalty program card of the consumer.

9. The computer program product of claim 7, wherein the computer readable program code for identifying the consumer during the point of sale transaction for purchasing different food items by the point of sale computer system, comprises computer readable program code for reading a radio frequency identification (RFID) dongle for a point of sale loyalty program card of the consumer.

10. The computer program product of claim 7, further comprising computer readable program code for alerting, by the smart refrigerator, the consumer when a food item in the smart refrigerator has an expiration date that has lapsed.

11. The method of claim 1, further comprising:
    updating, by the smart refrigerator, both an expiration date of the food item on the list of different food items and also the list of different food items in response to the consumer indicating the food item does not replace the food item on the list of different food items.

12. The system of claim 5, wherein the expiration data manager further comprises program code enabled to update both the expiration date of the food item on the list of different food items and also the list of different food items in response to the consumer indicating the food item does not replace the food item on the list of different food items.

13. The computer program product of claim 7, further comprising computer readable program code for updating, by the smart refrigerator, both an expiration date of the food item on the list of different food items and also the list of different food items in response to the consumer indicating the food item does not replace the food item on the list of different food items.

* * * * *